United States Patent Office 3,219,184
Patented Nov. 23, 1965

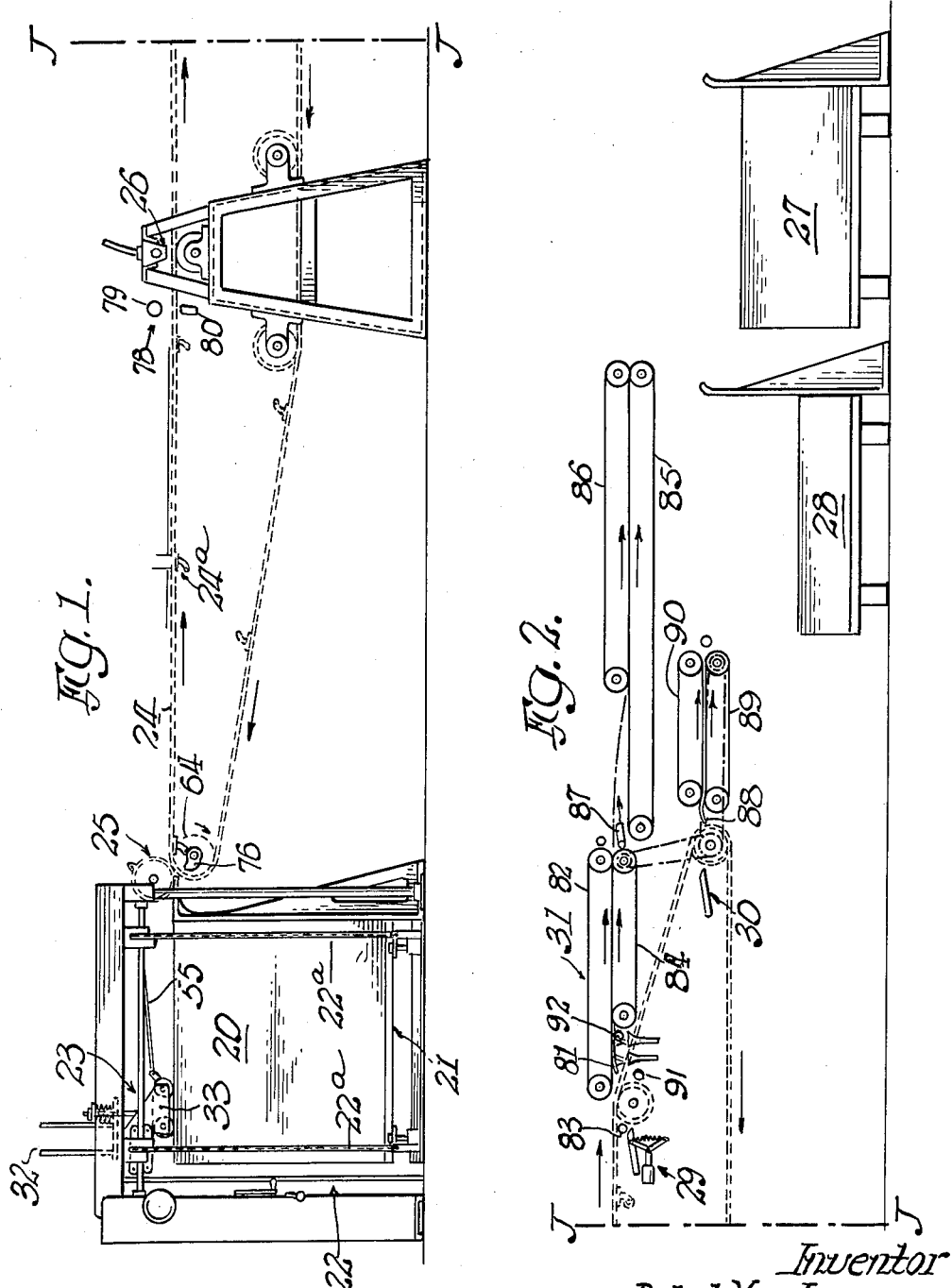

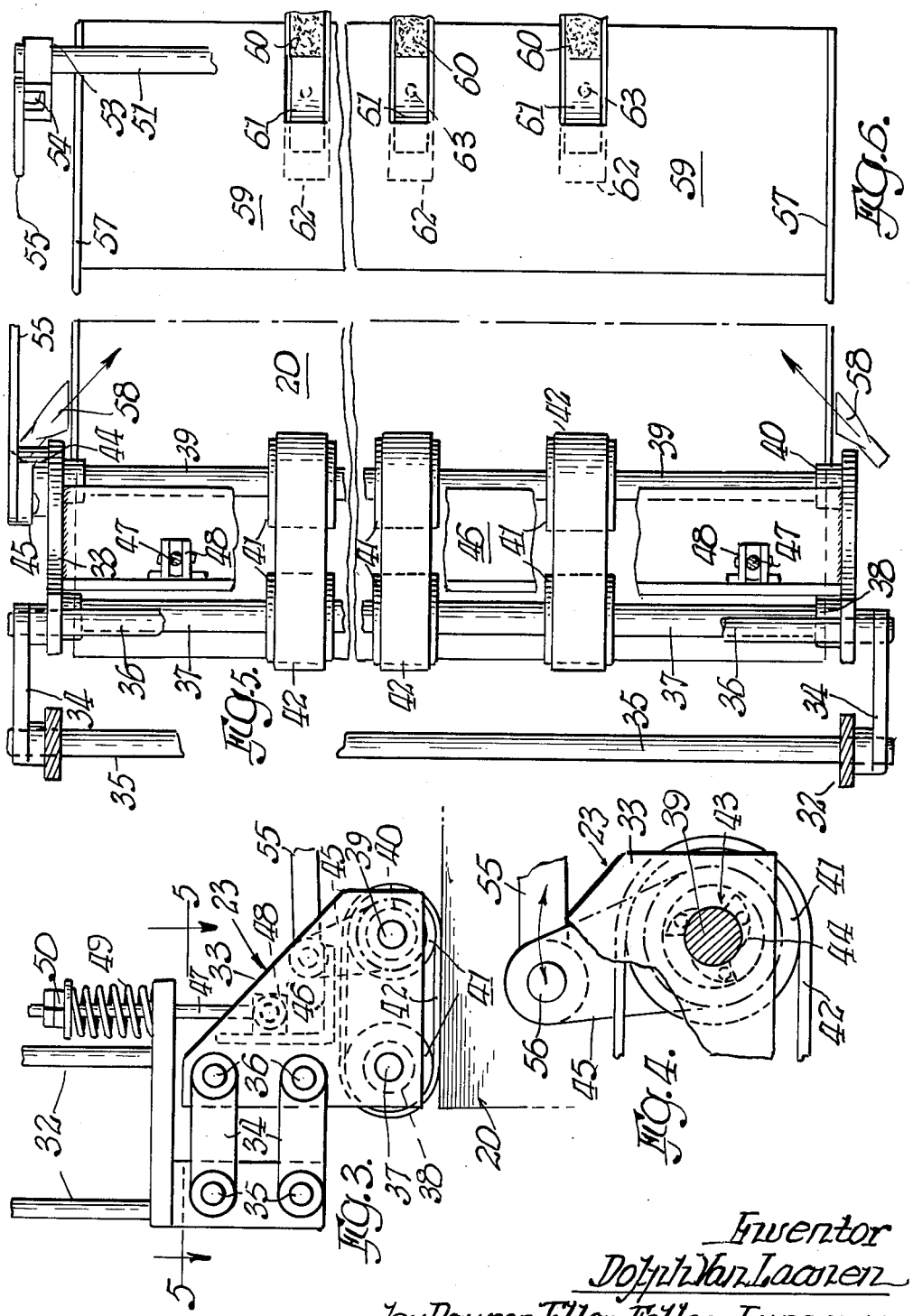

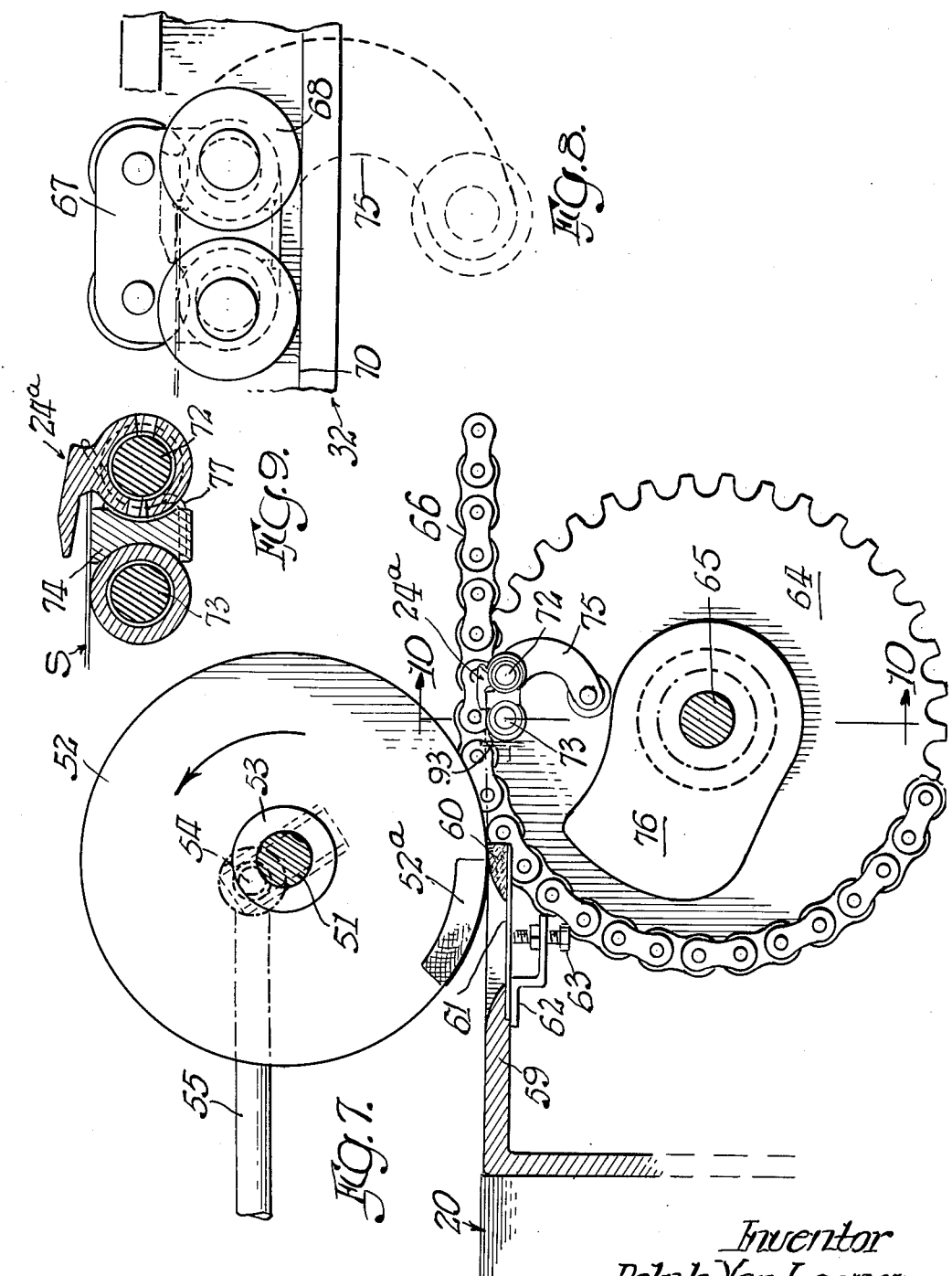

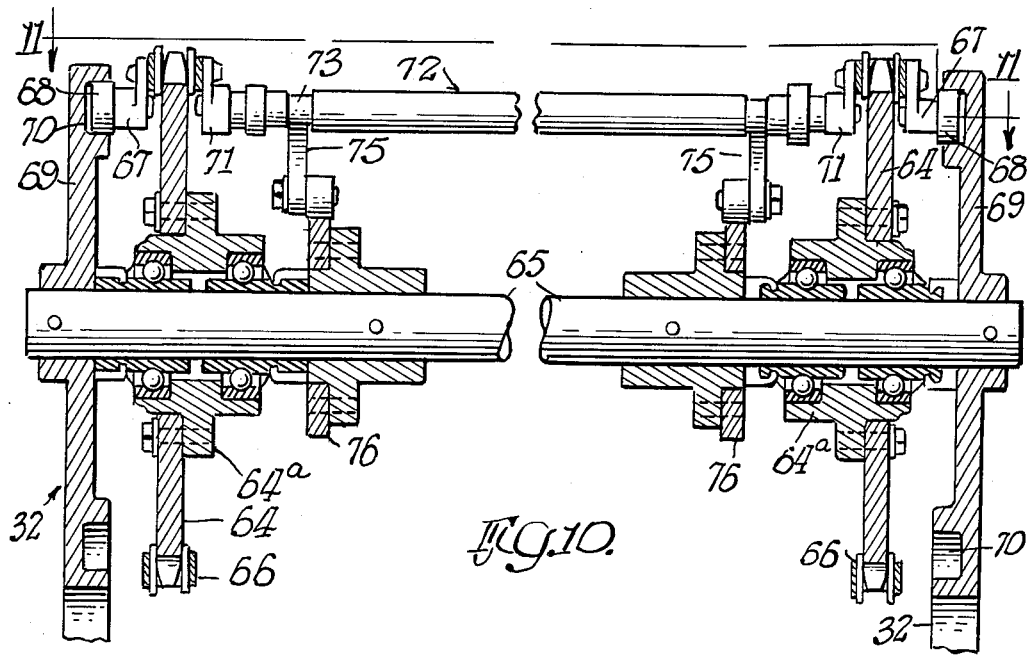
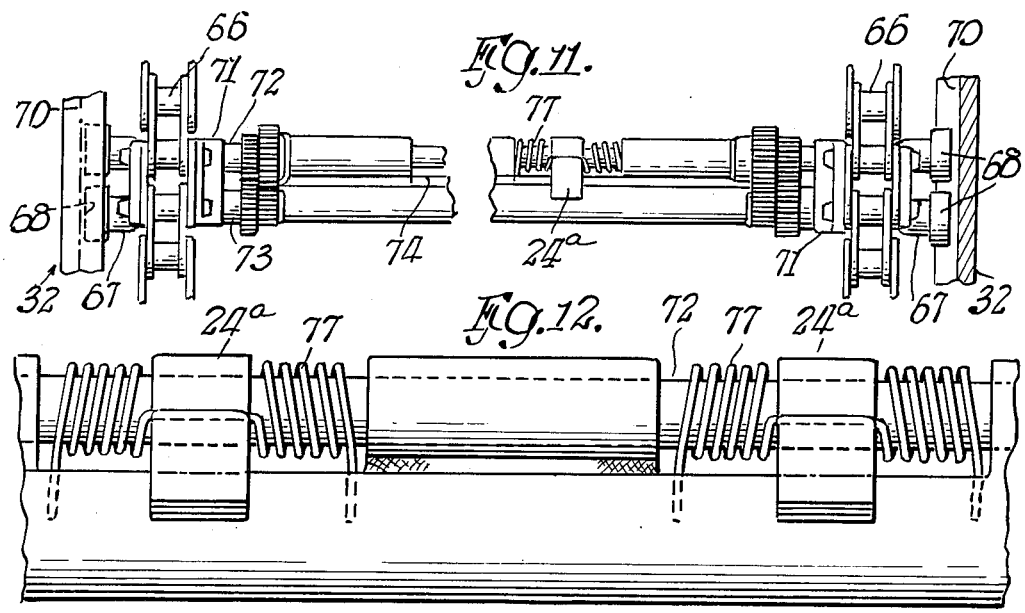

3,219,184
SORTING APPARATUS
Dolph V. Van Laanen, 903 S. Broadway, De Pere, Wis.
Filed Apr. 26, 1962, Ser. No. 190,283
2 Claims. (Cl. 209—73)

This invention relates to sorting apparatus, and, more particularly, to apparatus useful in the separation of sheet-like material according to the presence or absence of defects therein.

An important object of this invention is to provide high speed automatic inspection and sorting of material in sheet form, eliminating the laborious and time-consuming manual handling and visual inspection commonly used in the past. For this purpose, apparatus is provided which includes a means to remove sheets of material from a stack, thereafter inspect both sides of the material for flaws, holes, discolorations, or other imperfections, then reject sheets with such imperfections into one or more reject stacks (according to the degree of defectiveness) while passing the sheets without imperfections into a separate stack.

As such, the inventive apparatus avoids the previously-tolerated problems of continuous web inspection which required that the imperfect portion of the web be marked, after which the web was rewound and the imperfect portions eliminated by selective sheeting. In some cases, a single roll of material was subjected to combined web inspection and sheeting, with the perfect sheets gated or otherwise separated from the imperfect sheets. The use of a single roll constituted a real limitation to machine efficiency. Still further, the prior art attempted to use a multiple number of inspection heads arranged so as to simultaneously subject a series of rolls of material to combined web inspection and sheeting, with the resultant sets of perfect sheets being collected in a pile separately from the imperfect sets. However, the imperfect sheets had to be subjected further to individual inspection to salvage those perfect sheets in each set which were carried to the imperfect pile because of having been interposed over or under an imperfect sheet. In studied contrast to the foregoing, the present invention requires only that the material be sheeted from the parent roll without regard to imperfections or to the number of rolls being sheeted simultaneously, and the provision of apparatus for that purpose constitutes another object of the invention.

A further object of the invention is to provide apparatus for inspecting both sides of an opaque or translucent material simultaneously in its sheeted form.

Still another object of the invention is to provide, in apparatus of the character described, a means for feeding sheets of material in a timed continuous high speed stream in which the gap between the trailing and leading edges of the sheets is relatively small, i.e., a matter of a few inches.

Yet another object of this invention is to provide apparatus which presents the greatest possible area of the sheet to inspection with only a fraction of an inch of the sheet obscured along the leading edge only and without supporting tapes or belts being used, which would restrict the inspection area.

A further objective of the invention is to provide apparatus adapted for sorting sheet-like material wherein the apparatus is adapted to be coupled with simultaneous scanning or inspection mechanisms, the sheet-like material being pulled or advanced and wherein the sheet-like material is initially provided in stacked form and wherein the unstacking is achieved at high speed.

Yet a further object of the invention is to provide a sorting machine for relatively large-sized paper sheets wherein there is provided sheet supply means, means for forming a stream of sheets, means for transferring the sheets from the stream-forming means to a conveyor, means for inspecting the sheets while they are carried by the conveyor, a selective releasing means for allocating the sheets according to degrees of perfection, and means for transporting the released sheets into selective groups or piles.

The invention will be described in conjunction with an illustrative embodiment in the accompanying drawing, in which—

FIG. 1 is a schematic side elevational view of a portion of the inventive machine;

FIG. 2 is a view similar to FIG. 1 but showing the remaining portion of the machine as the two portions would be mated along the junction line J—J;

FIG. 3 is a fragmentary side elevational view of the sheet stream former or unstacking and shingling mechanism for sheets to be inspected;

FIG. 4 is a fragmentary enlarged sectional view of the lower right-hand portion of FIG. 3;

FIG. 5 is a sectional view such as would be taken from the sight line 5—5 of FIG. 3, and showing the trailing end of the stack of sheets to be inspected;

FIG. 6 is a fragmentary top plan view of a portion of the sheet transfer mechanism, showing the leading edge of the shingled stack of sheets to be inspected;

FIG. 7 is a fragmentary side elevational view of the transfer mechanism seen in FIG. 6 and also showing the entering end of the sheet conveyor;

FIG. 8 is an enlarged fragmentary view of the conveyor portion of the apparatus seen in FIG. 7;

FIG. 9 is a sectional view of the conveyor apparatus seen in FIG. 8;

FIG. 10 is a sectional view such as would be seen along the sight line 10—10 of FIG. 7;

FIG. 11 is a sectional view taken along the sight line 11—11 of FIG. 10; and

FIG. 12 is an enlarged fragmentary view of a portion of the apparatus seen in FIG. 11.

In the illustration given, and with particular reference to FIGS. 1 and 2, the numeral 20 designates a stack of sheets to be inspected and sorted according to whether imperfections are present or not. The present invention has application to especially large-sized sheets—of the order of 38" x 50"—and where the sheets are of cellulosic material, i.e., paper.

Reference to FIG. 1 reveals that the stack 20 is supported on a skid 21 which is carried by an elevator 22. The elevator 22 may be of conventional design, employing chains 22a for feeding the sheets upwardly through suitable electrical controls (not shown) until the topmost sheet comes in contact with a stream former or shingling mechanism generally designated 23. For this purpose, a variety of elevators 22 may be used, a suitable structure being the elevator used in conjunction with the Miehle-G-D feeder used with printing presses.

The result of the operation of the stream former 23 is to advance sheets in shingled fashion toward and into contact with the conveyor generally designated 24 through a transfer mechanism generally designated 25. The conveyor 24 includes a plurality of gripper bars 24a which grip the leading inch or so of the sheet and advance each sheet with the conveyor and in a sequential fashion.

During the course of sheet advancement, the sheets pass through an inspection device generally designated 26. Depending upon the response of the mechanism 26, the sheet will be deposited either in a reject stack 28 or a perfect stack 27. For this purpose, the machine is equipped with a pair of gripper release mechanisms 29 and 30 and a supplemental conveyor generally designated 31.

When a perfect sheet passes by the inspection head, no signal is sent to the gripper release mechanism 29, which then operates to disengage the gripper bars 24a from the sheet, permitting the sheet to flow onto the conveyor 31 and thus into the perfect stack 27. When an imperfection is sensed in the sheet by the mechanism 26, the gripper release mechanism 29 is deactivated so as not to disengage or release the gripper bars 24a, and the sheet follows the conveyor 24 until the grippers reach the continually operative release mechanism 30, after which they are necessarily deposited in the imperfect stack 28.

The invention will now be described with reference to the various mechanisms thereof, starting from the entering or feed-in end, and, for this purpose, the apparatus may be equipped with a rigid frame, a portion of which is designated by the numeral 32 (see the extreme upper left-hand portions of FIGS. 1 and 3).

Sheet stream former

Referring now to FIG. 3, the numeral 32 designates a fixed frame which supports a floating frame 33, this being achieved through links 34 pivoted at one end on the fixed frame shafts 35 and at the other end upon the floating frame link shafts 36. Thus, the floating frame 33 can describe a portion of an arc about the pivot points defined by the shafts 35.

To unload the paper from the stack 20, the floating frame is equipped with an idler shaft 37 suitably journaled in horizontally adjustable bearings 38 provided as part of the frame 33 (see FIG. 5). Additionally, the frame 33 is equipped with a drive shaft 39 carried in fixed bearings 40. Each of the shafts 39 and 37 are equipped with pulleys 41 (again see FIG. 5) which optimally may be spaced apart on 8″ centers transversely of the machine. The pulleys aligned longitudinally of the machine are connected by means of rigid belts 42 so that as the drive shaft 39 rotates, the shaft 37 follows.

For the purpose of providing rotation of an intermittent nature for the shaft 39, the shaft 39 is equipped with a one-way clutch 43 (see FIG. 4). The clutch 43 includes a hub 44 and a lever 45. The clutch 43 is so arranged that as the lever 45 is rotated counterclockwise, the drive shaft 39 is rotated, while upon clockwise rotation of the lever 45, the drive shaft 39 is stationary.

To insure that the floating frame, or, more particularly, the belts 42, are in pressure contact with the top or uppermost sheet of the stack 20, the floating frame is equipped with a reinforcing angle 46. This angle 46 receives the end of an I-bolt 47 as in a bracket 48, with the I-bolt passing through the fixed frame 32. A compression spring 49 is positioned about the I-bolt 47 and compressed between the frame 32 and a nut 50 so as to bias the floating frame 33 downwardly.

Sheet transfer mechanism

Referring now to FIG. 7, it will be seen that at the leading or forward end of the stack 20 there is located a feed wheel shaft 51. This may be conveniently supported within frame 32, and the shaft 51 is equipped with feed wheels 52 aligned with the pulleys 41 (compare FIGS. 5 and 6). Optimally, the outer periphery of the wheels 52 are of polished, chrome-plated steel into which are set segments of rubber 52a and which extend radially slightly beyond the polished diameter of the wheel. To the end of the feed wheel shaft 51 is fitted a T-slotted flange 53, into which a T head bolt 54 is fitted. A connecting rod 55 is connected to the bolt 54 and also to the lever 45 as at 56 (see FIG. 4).

The connecting rod serves to translate the rotary motion of the shaft 51 into reciprocating motion of lever 45, which in turn imparts an intermittent rotary motion to the shaft 39. This results that in each revolution of the feed wheel shaft 51, a movement of a successive top sheet toward the feed wheels 52 will be achieved. Further, it will be seen that such revolutions of the feed wheel shaft 51 will result in a number of the top sheets being fed forwardly in a shingled or fanned sequence.

Located at the top of the stack 20 and parallel with the sides of the stack are side guide plates 57 (see FIG. 6) which are mounted as part of the fixed support frame 32 and which are adjustable to stack width. As such, the guide plates 57 guide the shingled top sheets toward the feed wheels 52.

Located near the leading end of the stack 20 and coinciding vertically with the top of the stack 20, are sets of air blast nozzles 58 so oriented as to blow a stream of air horizontally across the top of the stack at about 45° to the line of sheet travel. The air blast thus separates the top leading sheets of the shingled stream and floats them sequentially on an air layer in readiness for feeding.

Located beneath the feed wheels 52 is a feed board 59 which is provided as part of frame 32 (see FIG. 7). It is upon the feed board 59 that the successive leading sheets of the shingled stream are supported. Through slots in the board which are located directly in line with the feed wheels 52, retarding blocks 60 are extended toward the feed wheels. The blocks 60 may be advantageously constructed of Carborundum and are fixed to leaf springs 61 which are biased downwardly against an adjusting screw 63 mounted in bracket 62 (again see FIG. 7).

The speed of the feed wheels 52 is such that the wheels make one revolution for each passage of a gripper bar 24a. The radial timing of the feed wheels is such that the leading edge of the rubber segment 52a arrives at the nip of the wheel and retarding block at the same instant that the trailing edge of the prior fed sheet leaves that location. The next sheet to be fed from the top of the stack at this instant has now been advanced beyond the grip of the fanning belt 42, and is supported by the feed board 59 and by the air cushion provided by the nozzles 58. However, this referred-to next sheet is held from further forward motion by the retarding blocks 60.

Continued rotation of the feed wheels creates a nip pressure between the rubber segments and the retarding blocks, advancing the top sheet forward to the point at which it is grasped on its leading edge by the gripper bars 24a. By the time the top sheet is fed by the amount of the peripheral length of the rubber segment 52a, a gap will exist between the leading edge of the fed sheet and the trailing edge of the preceding sheet due to the higher velocity of the conveyor 24. Into this gap, the next gripper bar 24a enters the grasp and carry the fed sheet forward, while the succeeding sheet is retarded between the retarding blocks 60 and the polished periphery of the feed wheels 52. The operation of this portion of the apparatus results in a steady, high speed flow of sheets of material just sufficiently spaced apart for gripping by the gripper bar 24a. The nature of the feeding mechanism allows the very thin, large sheets to be fed at speeds far beyond conventional reciprocating, vacuum lifting, steam feeders presently known, the speeds achievable herein being of the order of 1000 feet per minute.

Conveyor

The apparatus for advancing the sheets sequentially past the inspection device 26 will now be described, and with particular reference to FIGS. 7–12, the third and fourth drawing sheets.

First referring to FIG. 7, it will be seen that the conveyor 24 includes a tail sprocket 64. The sprocket 64 is rotatably mounted on a tail shaft 65 by a bearing 64a (see FIG. 10). It will be appreciated that a pair of sprockets 64 is provided to develop the chain and crossbar conveyor 24.

To guide the chains 66 in their longitudinal travel while transporting, i.e., pulling, the various sheets, the chains 66 are equipped with brackets 67 (see FIG. 10) which in turn are equipped with rollers 68 slidably mounted within guide slots 70 of the frame portion 69 of the rigid frame 32. From FIG. 10, it will be seen that the frame portion 69 also supports tail shaft 65.

Each chain 66 also carries brackets 71 for supporting the gripper bars 24a. Extending between opposite aligned gripper brackets 71 are gripper bar shafts 72 and 73 (see FIG. 11). As can be appreciated from a consideration of FIG. 9, the gripper bars 24a pivot with the first gripper bar shaft 72 into engagement with blocks 74 supported between the first and second shafts 72 and 73 so as to grip the leading edge of a sheet S.

To achieve this pivoting motion, the gripper bar shafts 72 are equipped with cam followers 75 (see FIG. 7) which engage cams 76 rigidly mounted on the tail shaft 65. The cams 76 thus overcome the urging of the coiled springs 77 which normally urge the gripper bars or heads 24a into engagement with the anvil blocks 74.

In operation, the contour of the cam 76 develops a snap closing action on the gripper bars 24a just as the grippers pass by the feed board or plate 59. Thereafter, with the gripper bars 24a being urged against the anvil blocks 74, the sheets are sequentially carried past the inspection mechanism 26 and to the release mechanisms 29 and 30.

Inspection head

The inspection head may be an electronic detection device produced by Nash and Harrison, Ltd., of Ottawa, Canada. This device simultaneously scans both sides of the sheet passing therethrough and delivers a signal to the solenoid-operated cam 29a whenever an imperfect sheet is sensed. It will be appreciated that suitable delay circuitry can be interposed between the head 26 and the release mechanism 29 so that the particular sheet sensed, if defective will be permitted to go to the reject stack 28 rather than to the perfect stack 27. As the sheet enters the inspection head 26, it passes through an antiflutter device generally designated 78, wherein a suction head 79 is mounted over an air jet 80. The device 78, by forcing the sheet up against the suction head, exerts just enough drag or tension on the sheet to keep it from fluttering during the critical inspection instant.

Inspected sheet transport mechanism

Mounted forward of the release point and extending back into the release area, is a set of stripper fingers 81. These are so spaced and situated that they extend over the gripper bar as it changes line of travel, and between the segmented portions of the gripper bar. The stripper fingers 81 act to assure positive release of the sheets from the gripper bar 24a, and further to guide the sheets in a level plane as they progress beyond the release point. Mounted above the stripper fingers 81 is a belt mechanism generally designated 82, which is synchronized to operate at a speed equal to or slightly greater than the conveyor 24. Air jets from beneath the stripper fingers as at 83 force the sheet upward against the belt 82, thus creating enough pressure to drive the sheet forward over the stripper fingers 81.

A second belt mechanism generally designated 84 supports the sheet from beneath after it has passed beyond the stripper fingers. This belt mechanism and the one above it, i.e., 82, serve to carry the released sheet clear of the release area.

The perfect sheet drops from the high speed parallel belt mechanisms 82 and 84 onto a slower-moving belt 85 in such a manner that the sheets are overlapped upon each other, or shingled. The slow-down belt 85 then carries the overlapped stream of perfect sheets into the stacking apparatus of layboy 27, where jogging arms and air jets (not shown) combine to build a pile of perfect sheets. Such a layboy may take the form of the Maxon Layboy produced by Maxson Automatic Machinery Company, of Westerly, Rhode Island. It will be appreciated that the slow-down belt 85 is interconnected with the circuitry of the inspection mechanism 26 and the gripper release mechanism 29, so that the slow-down belt 85 is stopped when defective sheets are by-passed beyond the release point for perfect sheets. Otherwise, passage of defective sheets would cause gaps in the overlapped stream and thus interfere with the stacking operation of the perfect sheet. Facilitating the transfer of the sheet from the high speed belts 82 and 84 to the slow speed belt 85 and its companion belt 86, is an air float mechanism 87 (see FIG. 2).

A similar arrangement of stripper fingers 88 and belts 89 and 90 are provided for the defective sheets, and it will be appreciated that if further refinement is desired, separation of the sheets into various degrees of imperfection may be utilized by reproducing the various individual structures presented herein for the two-way separation.

As a defective sheet is carried past the release mechanism 29, the line of travel of conveyor 24 changes and drops downward to put the gripper bars 24a beneath the release point. To assist in putting the defective sheet into this new plane, a vacuum roll 91 may be employed. Suction thus causes the sheet to wrap partially around this roll. Air jets 92 may be used to force the sheet against the vacuum roll at the point of initial contact. The wrap thus created is sufficient to keep the otherwise unsupported sheet from whipping as it is carried into a new line of travel. The defective sheet is released when the cam follower 75 strikes the cam 30, after which the procedure for transporting the defective sheets is the same as that discussed hereinabove relative to the perfect sheets.

Operation

In the operation of the machine, the length of the sheet will govern the number of gripper bars 24a used and the length of the chain. Also, the length of the sheet governs the adjustment of the connecting rod stroke (its eccentricity at the feed wheel). The length of the sheet further governs the setting of the jogging arms and stops (not shown) at the perfect sheet layboy and reject piler.

The width of the sheet governs the following factors: (1) transverse setting of feed belts and wheels; (2) adjustment of side guides at feed end; (3) adjustment of jogging arms and guides at perfect sheet layboy and at reject piler; (4) location of air blast nozzles at feed end; (5) location of air jets at release point for perfect paper; (6) number of photocell units operative in inspection head; and (7) location of inspection head in transverse direction to line of sheet travel.

The length and thickness of the sheet govern the speed of the slow-down tapes (for the amount of overlap at the release for perfect sheets. The thickness and type of sheet govern the adjustment of the fanning belt 42 and its pressure on the stack at the feed end as well as the adjustment of the leaf spring setting for gap between retarding block and feed wheels.

The width, length, thickness and type of sheet govern the air pressure setting at the feed end air nozzles, at the anti-flutter device, and at the release points.

The initial step is to place a supply of paper to be sorted onto the skid 21, the elevator chains 23a being hung sufficiently, out of the way for side entry of a loaded skid of sheets. The chains operate through electrical controls (not shown) to elevate the paper until the paper comes into contact with the fanning belt 42. Thereafter, the main drive is started, and the feed assembly, conveyor assembly, and receiving assembly move in synchronized fashion. At the same time, the inspection head is energized.

Rotation of the feed wheel shaft 51 and consequent rotation of fanning belts through connecting rod 55 and clutch 43 creates an overlapped stream of paper which moves forward until the leading sheet meets the retarding blocks 60. The retarding blocks 60 momentarily interrupt the forward progress of the leading sheet until the revolution of the feed wheels 52 brings the rubber segment 52a into contact with a sheet. Continued rotation of the feed wheels 52 creates nip pressure between the rubber segment 52a and the retarding blocks 60, thus driving the top sheet forward in timed relation, synchronized with the arrival of the gripper bar 24a. The top sheet being fed through the nip meets an arresting gate 93, which positions the leading edge for grasp by the gripper bar 24a.

The gripper bar 24a being carried by the sheet conveyor 24 arrives at the pick-up point with the bar heads 24a raised open above the anvil blocks 74 due to the action of cam 76, cam follower 75, and the gripper bar spring mechanism 77. Continued travel of the gripper bar 24a and subsequent action of cam follower 75 and gripper bar spring 77 brings the grippers down over the leading edge of the sheet and into contact with the anvil block 74. The speed of the conveyor 24 is such that the entire length of one sheet is pulled over the retarding blocks 60 before the feed wheels 52 complete revolution and the rubber segments 52a again arrive at the feed position. The sheet thus gripped is advanced with the conveyor 24 through the inspection head 26 for ultimate disposition in a perfect or reject pile.

While, in the foregoing specification, a description of an embodiment of the invention has been set down in considerable detail to inform those skilled in the art in the practice of the invention, many variations in the details herein given may be made by those skilled in the art without departing from the spirit and scope of the invention.

I claim:
1. In a sorting machine for separating acceptable from unacceptable sheets wherein the machine has a frame interposed between means for elevating a stack of horizontally-disposed, generally rectangular sheets and a plurality of inspected sheet receivers,
(A) means on said frame for sequentially shifting the sheet uppermost on said stack to provide a sheet edge portion in overlapping relation with the rest of said stack,
(B) conveyor means on said frame equipped with grippers for gripping said edge portion to horizontally advance said sheet,
(C) sheet inspection means on said frame for simultaneously ascertaining the presence of defects in both sides of said sheet,
(D) first gripper disengagement means in said frame responsive to said inspection means for directing sheets to one of said receivers, and
(E) second gripper disengagement means on said frame subsequent to said first disengagement means in the path of gripper travel, said second disengagement means directing gripped sheets undisengaged by said first means into another of said receivers, said conveyors means including crossbar-equipped chains, said crossbars being equipped with pivotally mounted jaw elements, spring means on said crossbars normally urging said jaw elements into clamping relation with said crossbars, said conveyor means also being equipped with sprockets on which said chains are mounted, a tail shaft in said frame supporting said sprockets, and cam means on said tail shaft for pivoting said grippers out of clamping engagement with said crossbars so as to receive the said sheet edge portion.

2. In a sorting machine for separating acceptable from unacceptable paper sheets, an elevator for elevating a stack of horizontally disposed, generally rectangular paper sheets, a horizontally elongated frame about said elevator and equipped with a sheet shifter above said elevator for sequentially shifting the sheet uppermost on said stack to provide a sheet edge portion in overlapping relation with the rest of said stack, a horizontally disposed gripping conveyor on said frame adapted to grip the leading edge portion of said uppermost sheet to horizontally advance said sheet, a feed wheel on said frame interposed between one end of said conveyor and said sheet shifter for advancing and controlling said uppermost sheet toward and into said conveyor, sheet inspection means on said frame for simultaneously ascertaining the presence of defects in both sides of said sheet, a pair of receivers, one for acceptable sheets and one for unacceptable sheets, horizontally spaced adjacent the other end of said conveyor, and means responsive to a signal from said inspection means for conducting a given sheet to one of said receivers.

References Cited by the Examiner
UNITED STATES PATENTS

| | | | |
|---|---|---|---|
| 1,964,499 | 6/1934 | Blasseur | 271—10 |
| 2,530,644 | 11/1950 | Bloom | 271—10 |
| 2,736,431 | 2/1956 | Coleman | 209—71.2 |
| 2,773,585 | 12/1956 | Caulfield | 271—79 X |
| 3,025,051 | 3/1962 | David | 271—34 |

ROBERT B. REEVES, *Primary Examner.*
SAMUEL F. COLEMAN, ERNEST A. FALLER,
*Examiners.*